UNITED STATES PATENT OFFICE.

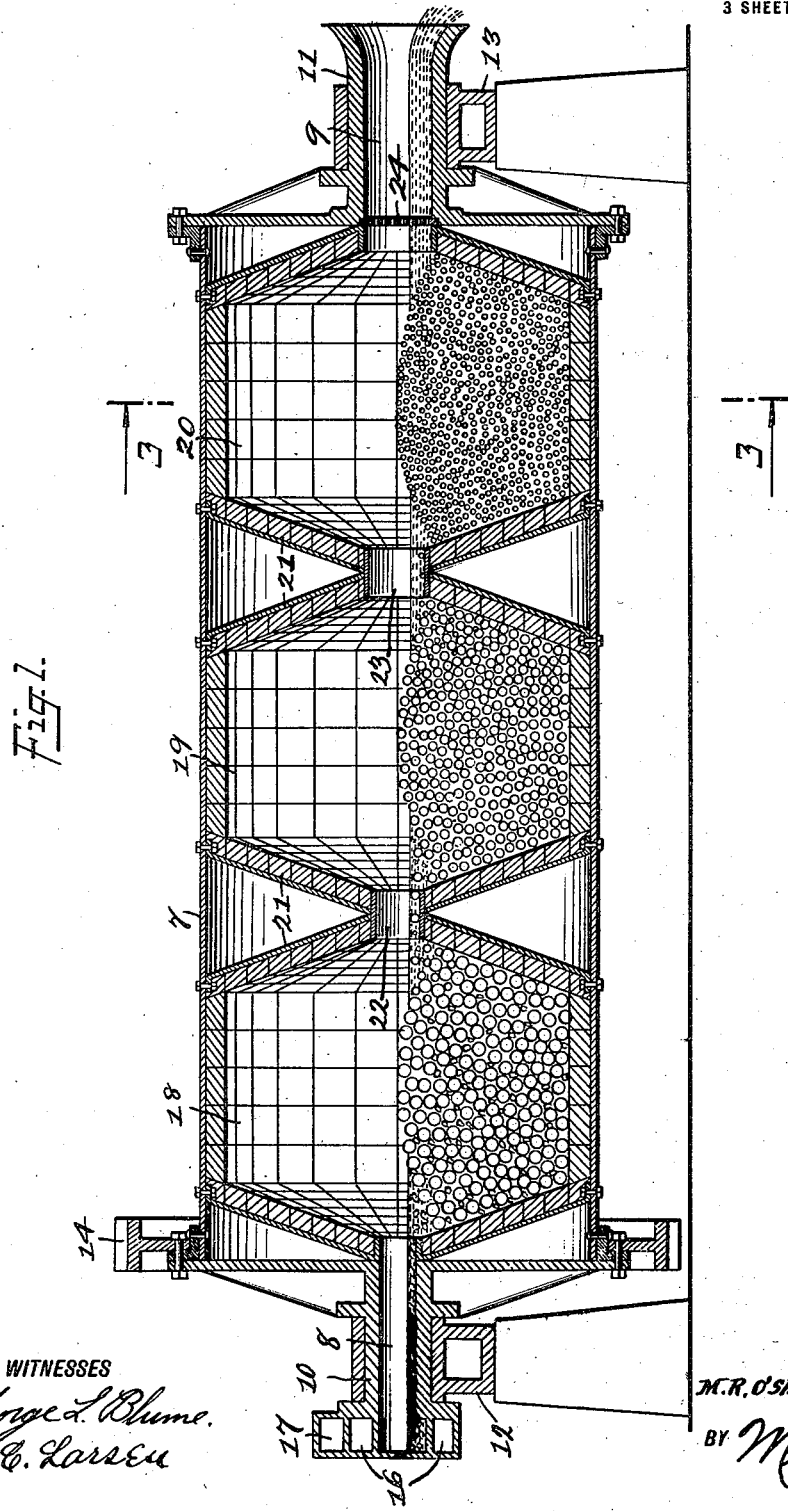

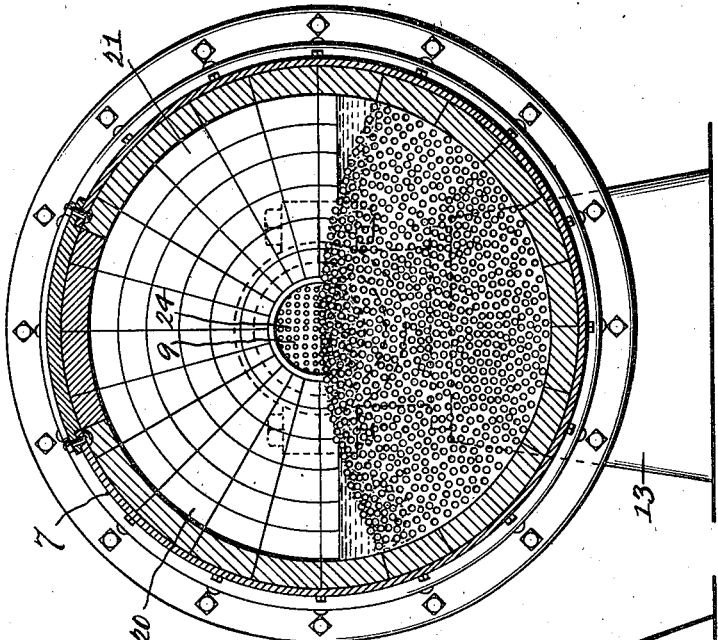
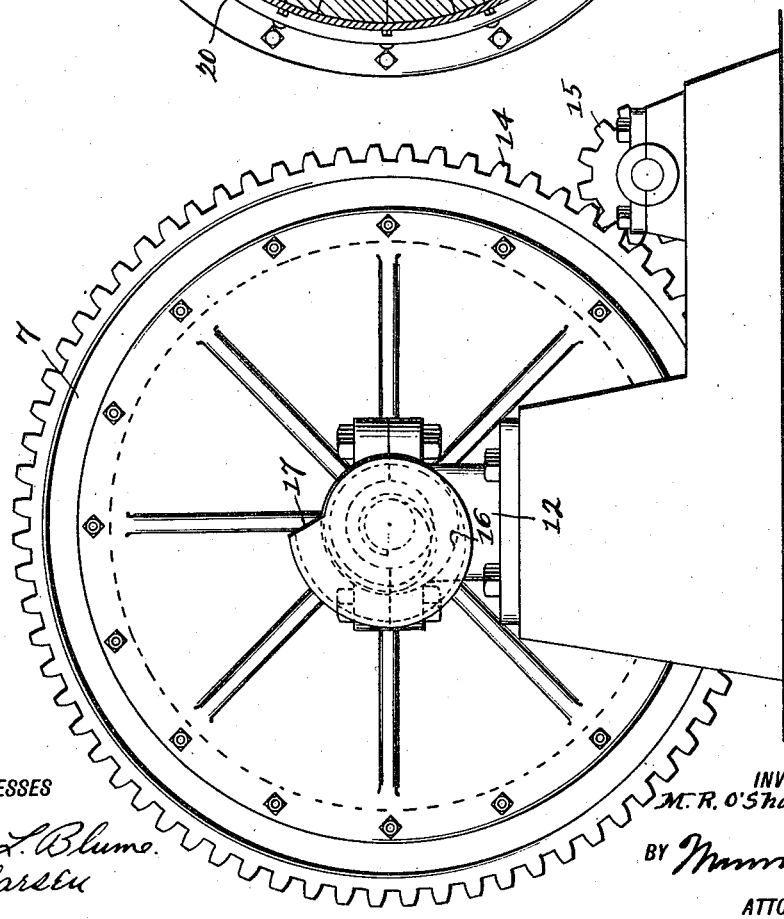

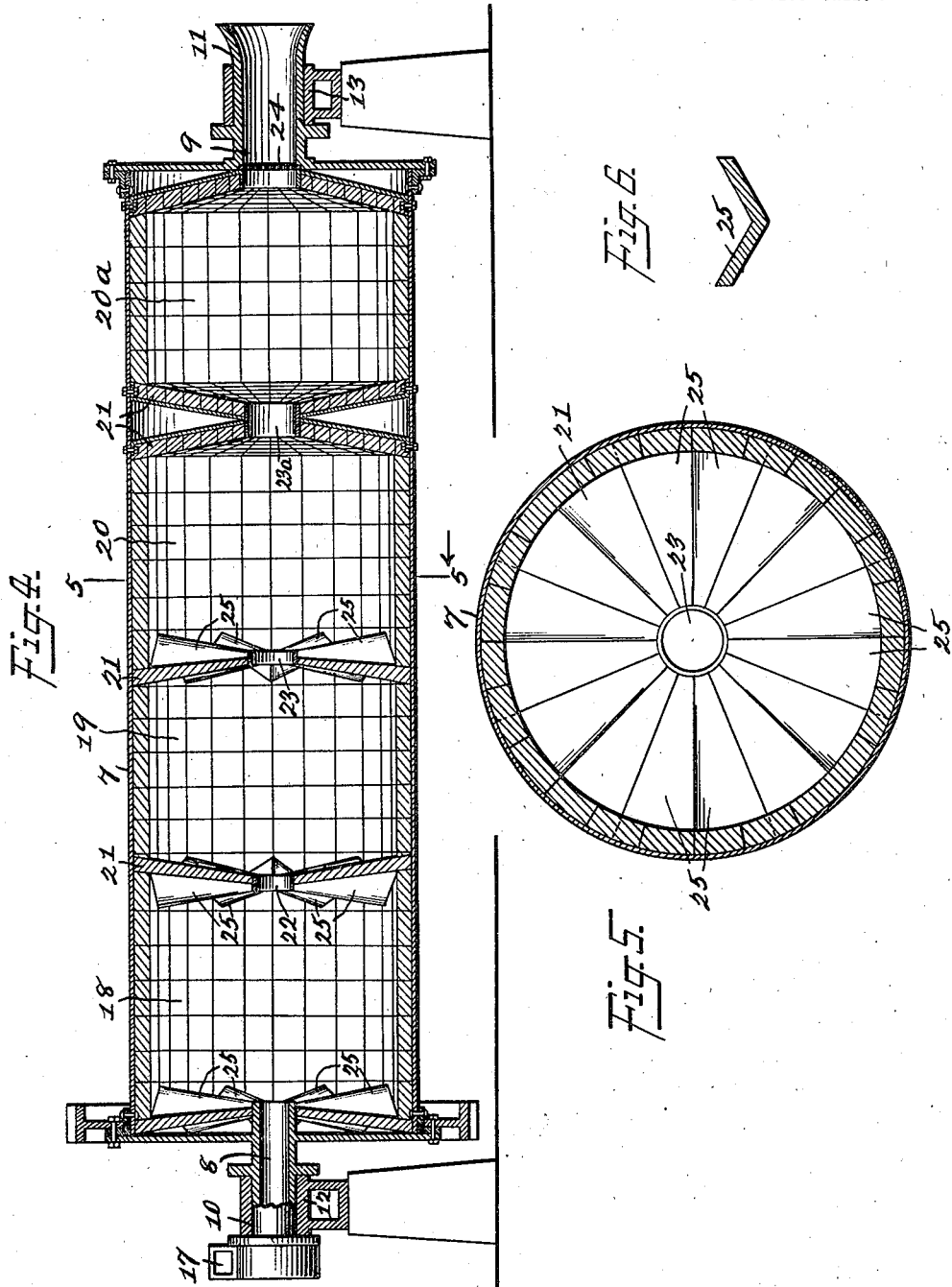

MARTIN RODERICK O'SHAUGHNESSY, OF ELMSDALE, NOVA SCOTIA, CANADA.

PULVERIZING-MILL.

1,185,342.

Specification of Letters Patent.

Patented May 30, 1916.

Application filed July 28, 1915. Serial No. 42,254.

*To all whom it may concern:*

Be it known that I, MARTIN R. O'SHAUGHNESSY, a subject of the King of Great Britain, and a resident of Elmsdale, county of Hants, Province of Nova Scotia, Dominion of Canada, have invented certain new and useful Improvements in Pulverizing-Mills, of which the following is a specification.

My invention relates to the treatment of ores, gravel, sand, and the like in mining operations, and has particular reference to what are known as pebble mills for reducing the metal bearing material to slimes.

I accomplish the desired results by means of a plurality of casings forming a unit rotatably mounted and provided with a relatively small inlet at one end, a relatively large outlet at the other end and openings between the casings successively increased in diameter from the inlet to the outlet ends, whereby the altitude of said inlet, openings, and outlet are successively decreased from the inlet to the outlet ends, and I may also use certain radial convolutions in the casings which increase outwardly in depth.

My invention is fully described in the following specification, of which the accompanying drawings form a part, in which like characters refer to like parts in each of the views, and in which:—

Figure 1 is a longitudinal, vertical, section taken through a pulverizing mill constructed in accordance with my invention, from its fundamental view point; Fig. 2 is an enlarged end view thereof, from the left side of Fig. 1; Fig. 3 is a section taken on the line 3—3 of Fig. 1; Fig. 4 is a view similar to Fig. 1 but showing a modification thereover; Fig. 5 is an enlarged section taken on the line 5—5 of Fig. 4; and Fig. 6 is a detached sectional view of a detail.

In the drawings forming a part of this application I have shown a tube 7 closed at its ends with the exception of a relatively small inlet 8 and a relatively large outlet 9 in tubular sections 10 and 11, respectively, carried by the respective ones of two bearings 12 and 13, whereby said tube 7 may revolve in a vertical plane, a gear 14 being formed on said tube 7 enmeshed with a pinion 15 connected with a source of power.

The outer end of the inlet is capped by a casing having a spiral passage 16 leading from the periphery thereof to said inlet, the mouth 17 of which is adapted to scoop up material to be ground in the revolution of the tube 7, as from a hopper, box, or other suitable container kept supplied in any suitable manner.

The tube 7 is divided into compartments 18, 19, and 20 in the form shown, any desired number of which may be provided within the limits of the tube, by means of partitions 21, preferably inclined so that each compartment presents, in section, a hexagonal appearance.

The compartments 18 and 19 are joined by means of a passage 22 somewhat larger in diameter than the inlet 8 whereby the discharge level of the compartment 18 is somewhat lower than the inlet level. The compartments 19 and 20 are similarly joined by a passage 23 of greater diameter than the passage 22 whereby the discharge level of the compartment 19 is lower than the inlet level thereof. The compartment 20 discharges into the outlet 9 which is of greater diameter than the passage 23 for the reason above stated, and I prefer to guard the outlet 9 by means of a strainer 24 of any desired mesh.

As stated, any desired number of the compartments may be provided, but the discharge passage of each will be on a lower level than the inlet passage whereby the partially reduced material in one compartment will be carried to the next compartment by the water or solution to be still further reduced, and this is repeated in the successive compartments until the material is delivered at the discharge end of the mill in a degree of fineness determined by the relative quantities of material and water or solution fed thereinto.

The first compartment 18 contains the coarsest pebbles or balls, the second compartment somewhat finer or smaller, and the third compartment the finest or smallest, a sufficient quantity of pebbles or balls being maintained within all of the compartments to be on an approximate level with the inlet of each; it will be obvious that the larger the size of the pebbles or balls in the successive compartments the fewer in number they will be and the larger the spaces therebetween, whereby the larger sizes will not pulverize as finely as the smaller sizes, and the pebbles or balls are thus downwardly graded in size in the several compartments from the inlet to the discharge ends of the mill.

As will be manifest, the pebbles or balls in any compartment are gradually reduced in size by the wearing action therebetween and, due to specific gravity, the smaller ones are forced to the top of the pebbles or balls in one compartment and carried to the next compartment, from end to end of the mill, thus providing an automatic grading of the pebbles or balls in the several compartments, from coarse to fine, this being controlled by the size and quantity of pebbles or balls supplied to the first compartment, suitable inlets being provided in each compartment, shown in Fig. 3. This classification of pebbles or balls insures a corresponding classification of the fineness of the material in the several compartments, this being a highly desirable feature not possible to the old style mill, the successively downward graded pebbles or balls constituting successively more effective grinding units, although all the compartments collectively comprise one operating unit, as they are all carried by the tube 7.

If steel balls are used, the wear thereon is hardly appreciable, and this compartment structure enables an operator to supply each compartment with the most desirable sizes according to the material being fed into the mill and to the character of the desired output.

It will be obvious from the foregoing that a mill constructed in accordance with my invention will have a greater output of more uniformity than in a mill of equal grinding area in which but one size of pebbles or balls is used or wherein pebbles or balls of different sizes are contained in but one compartment.

In Figs. 4, 5 and 6, I have illustrated a highly important modification over the comparatively smooth walls shown in the preceding figures, and which is particularly adapted to the use of balls or heavy pebbles which have a tendency to cascade in bulk at times in the revolution of the mill. This modification consists of making the walls or partitions 21 of convoluted form, and the convolutions of which gradually increase in length and height at increasing radial distances from the axis of the tube 7, these convolutions constituting lifts for the grinding elements. These lifts cause an energetic displacement of the pebbles in their bombarding effect toward the center of each compartment. Further, if so desired, a slight lessening of the angle wall on the discharge end of each compartment will bring a more effective displacement toward the inlet end, thus placing the larger and heavier pebbles where most desired, or vice versa, the classification of the pebble content being practically controlled by angle or lift of the partition wall. These convolutions are shown at 25, Figs. 4, 5, and 6, the last named figure illustrating one degree of angularity at any desired distance from the axis of the mill, but I could also gradually vary the angular relationship of the inclined faces forming the lifts from one end of each lift to the other.

While I may construct new mills in accordance with my invention, I am also enabled to reconstruct old mills of the single tube type to come within the scope and results of my invention, the change from the old type to my improved form being of relatively low cost.

While I have shown, in effect, distinct mills driven from a common source of power, there is coaction therebetween, one depending upon the other in the efficiency of the whole, both as to the capacity of the mill and as to the character of the output, as well as insuring classification of both grinding materials and materials being ground.

Having fully described my invention, what I claim as new, and desire to secure by Letters Patent, is:—

1. A mill of the class described, comprising a plurality of casings or compartments forming a unit provided with a relatively small inlet at one end, a relatively large outlet at the other end, and openings successively increased in diameter between the compartments from the inlet end to the outlet end, bearings for the ends of said mill, and means for revolving said mill.

2. A mill of the class described, comprising a unitary structure divided into a plurality of partitions the end walls of each of which have radial convolutions which increase outwardly in depth, each of said compartments being provided with inlet and outlet passages connecting all of said compartments, bearings for the end of said structure, and means for revolving said structure.

3. A mill of the class described, comprising a plurality of compartments forming a unit provided with a relatively small inlet at one end, a relatively large outlet at the other end, and openings between the compartments, the lower edges of said inlet, openings, and outlet, being successively decreased in altitude from the inlet end to the outlet end, bearings for the ends of said mill, and means for revolving said mill.

In testimony whereof I have signed my name to this specification in the presence of two subscribing witnesses.

MARTIN RODERICK O'SHAUGHNESSY.

Witnesses:
GEORGE HOFF,
EDNA CHALK.